(12) United States Patent
Wang et al.

(10) Patent No.: US 11,461,421 B2
(45) Date of Patent: Oct. 4, 2022

(54) TECHNIQUES FOR SUGGESTING SKILLS

(71) Applicant: Microsoft Technology Licensing, LLC, Redmond, WA (US)

(72) Inventors: Yiming Wang, Sunnyvale, CA (US); Xiao Yan, Sunnyvale, CA (US); Lin Zhu, Santa Clara, CA (US); Jaewon Yang, Sunnyvale, CA (US); Yanen Li, Foster City, CA (US); Jacob Bollinger, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 29 days.

(21) Appl. No.: 17/136,864

(22) Filed: Dec. 29, 2020

(65) Prior Publication Data
US 2022/0207099 A1 Jun. 30, 2022

(51) Int. Cl.
*G06F 16/9535* (2019.01)
*G06N 3/04* (2006.01)
*G06N 20/20* (2019.01)
*G06F 16/36* (2019.01)

(52) U.S. Cl.
CPC ........ *G06F 16/9535* (2019.01); *G06F 16/367* (2019.01); *G06N 3/0454* (2013.01); *G06N 20/20* (2019.01)

(58) Field of Classification Search
CPC .. G06F 16/9535; G06F 16/367; G06N 3/0454
See application file for complete search history.

(56) References Cited

U.S. PATENT DOCUMENTS

2017/0293844 A1* 10/2017 Gombolay ............. G06N 7/005
2017/0344555 A1* 11/2017 Yan ................... G06F 16/24578
2020/0233873 A1* 7/2020 Kamotsky ............. G06N 20/00

OTHER PUBLICATIONS

Cao, et al., "Learning to Rank: From Pairwise Approach to Listwise Approach", In Proceedings of the 24th International Conference on Machine Learning, Jun. 20, 2007, pp. 129-136.
Chen, et al., "XGBoost: A Scalable Tree Boosting System", In Journal of the Computing Research Repository, Mar. 9, 2016, 13 Pages.
(Continued)

*Primary Examiner* — Grace Park
(74) *Attorney, Agent, or Firm* — Schwegman Lundberg & Woessner, P.A.

(57) ABSTRACT

Techniques for ranking skills using an ensemble machine learning approach are described. The outputs of two heterogenous, machine-learned models are combined to rank a set of skills that may be possessed by an end-user of an online service. Some subset of the highest-ranking skills is then presented to the end-user with a recommendation that the skills be added to the end-user's profile. The ensemble learning technique involves a concept referred to as "boosting", in which a weaker performing model is enhanced (e.g., "boosted") by a stronger performing model, when ranking the set of skills. Accordingly, by using a combination of models, better results are achieved than might be with either one of the individual models alone. Furthermore, the approach is scalable in ways that cannot be achieved with heuristic-based approaches.

20 Claims, 9 Drawing Sheets

(56) References Cited

OTHER PUBLICATIONS

Li, Hang, "A Short Introduction to Learning to Rank", In Journal of IEICE Transactions on Information and Systems, vol. 94, Issue 10, Oct. 1, 2011, pp. 1854-1862.

Li, et al., "Combining Decision Trees and Neural Networks for Learning-to-Rank in Personal Search", In Proceedings of the 25th ACM SIGKDD International Conference on Knowledge Discovery & Data Mining, Jul. 25, 2019, pp. 2032-2040.

* cited by examiner

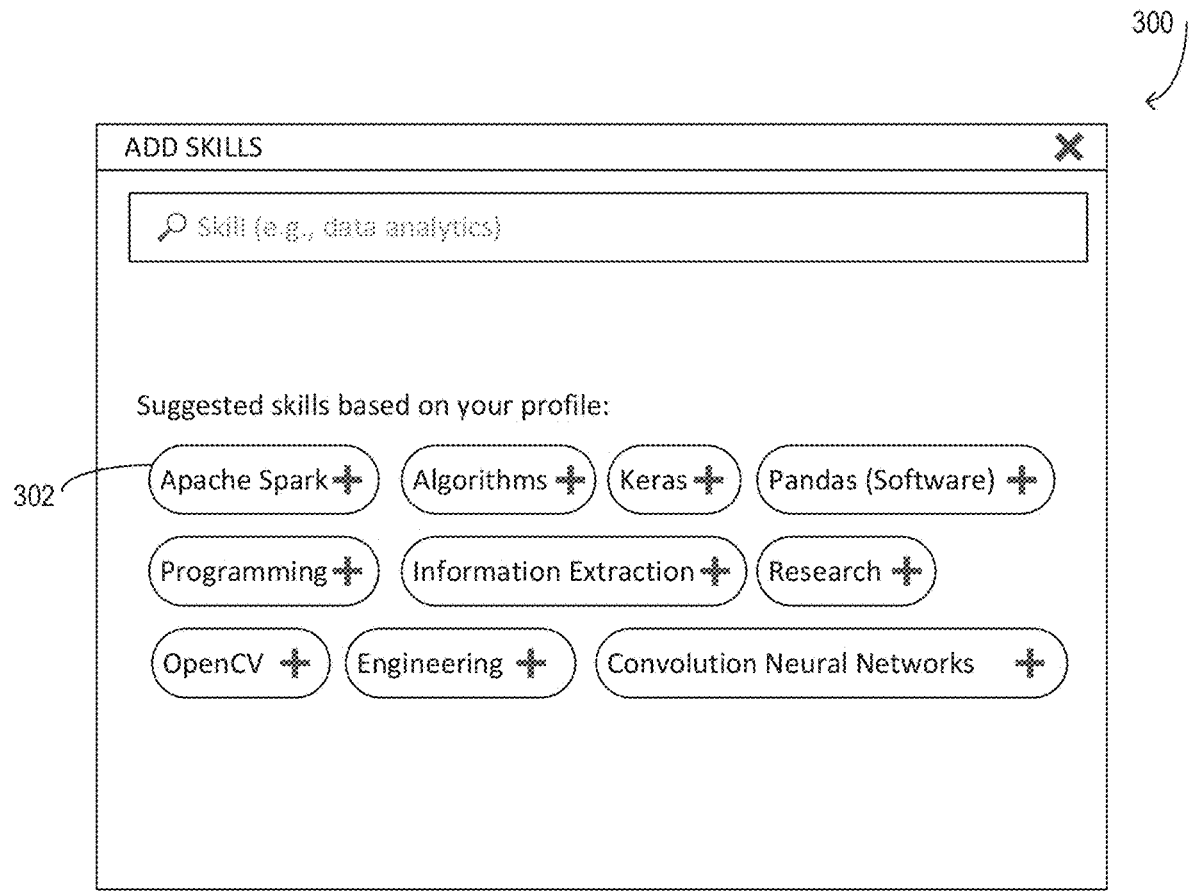
FIGURE 3 (EXAMPLE UI)

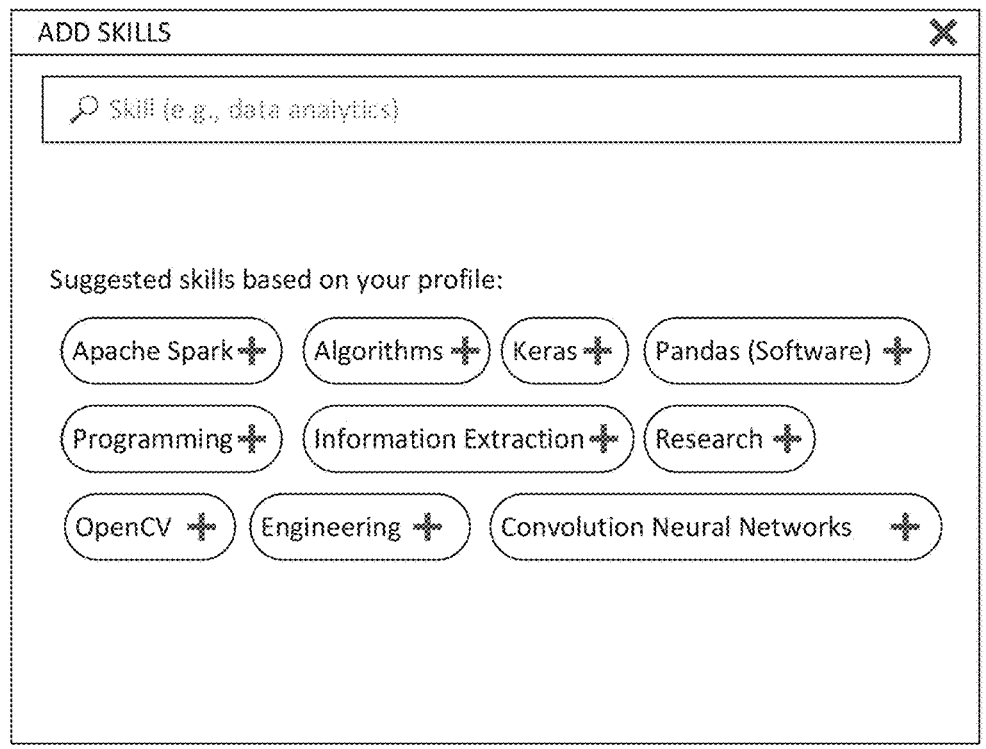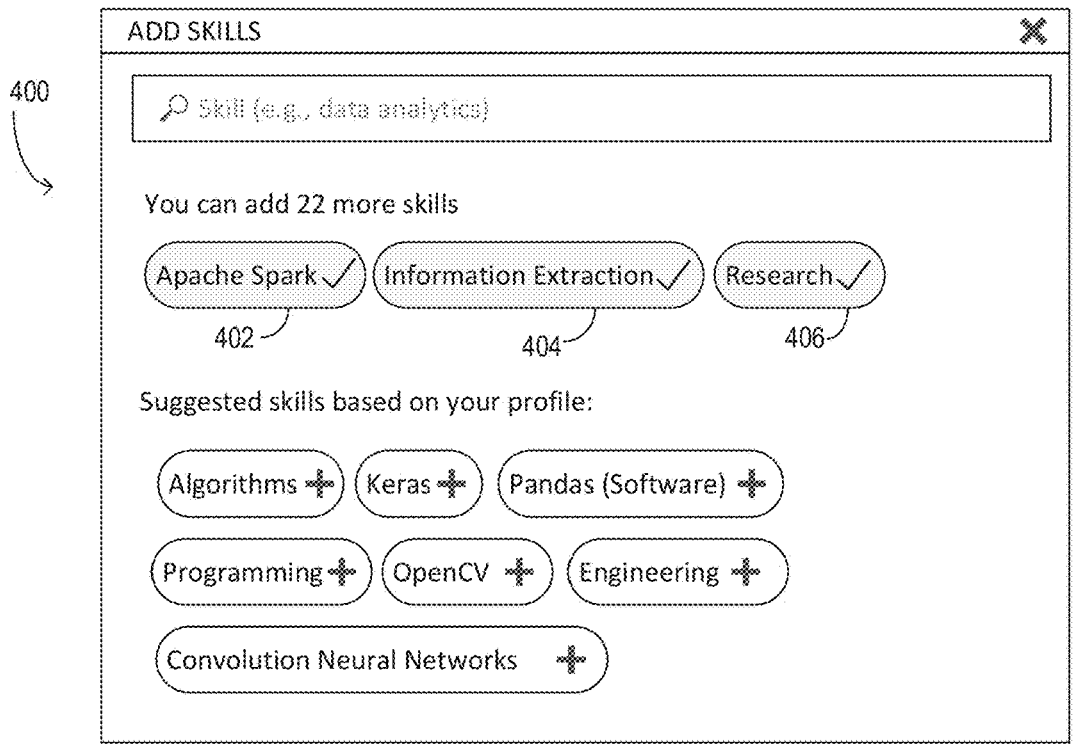
FIGURE 4 (TRAINING DATA)

TECHNIQUES FOR SUGGESTING SKILLS

TECHNICAL FIELD

The present application generally relates to data processing and presentation techniques. More precisely, the present application describes an ensemble machine learning technique for use in identifying, ranking and presenting to an end-user of an online system a set of skills that the end-user may possess, and which the end-user may desire to add to his or her end-user profile.

BACKGROUND

Online service providers, such as social networking services, e-commerce and marketplace services, photo sharing services, job hosting services, educational and learning services, and many others, typically require that each end-user register with the individual service to establish an end-user account. In most instances, an end-user account will include or be associated with an end-user profile—a digital representation of a person's identity. As such, an end-user profile may include a wide variety of information about the end-user, which may vary significantly depending upon the particular type and nature of the online service. By way of example, in the context of a social networking service, an end-user's profile may include information such as: first and last name, e-mail address, age, location of residence, a summary of the end-user's educational background, job history, and/or experiences, as well as individual skills possessed by the end-user. An end-user profile may include a combination of structured and unstructured data. For example, whereas an end-user's age may be stored in a specific data field as structured data, other profile information may be inferred from a free form text field such as a summary of an end-user's experiences. Furthermore, while some portions of an end-user profile, such as an e-mail address, may be mandatory—that is, the online service may require the end-user to provide such information in order to register and establish an account—other portions of an end-user profile may be optional.

In many instances, the quality of the experience an end-user has with a particular online service may vary significantly based on the extent to which the end-user has provided information to complete his or her end-user profile. Generally, the more complete an end-user profile is, the more satisfied the end-user is likely to be with various features and functions of the online service. By way of example, consider the extent to which an end-user has listed in his or her profile for a professional social networking service the skills possessed by the end-user. In the context of a professional social networking service, a variety of content-related and recommendation services utilize various aspects of an end-user's profile information—particularly skills—for targeting end-users to receive various content and for generating recommendations. For example, a content selection and ranking algorithm associated with a news feed, which may be referred to as a content feed, or simply a feed, may select and/or rank content items for presentation in the end-user's personalized content feed based on the extent to which the subject matter of a content item matches the perceived interests of the end-user. Here, the end-user's perceived interests may be based at least in part on the skills that he or she has listed in his or her profile. Therefore, having an accurate and complete end-user profile will improve the quality of the content that the end-user receives in his or her personalized content feed. Similarly, a job-related search engine and/or recommendation service may select and/or rank job postings for presentation to an end-user based in part on skills listed in a profile of the end-user. Finally, a recommendation service for online courses may generate course recommendations for an end-user based at least in part on the skills that the end-user lists in his or her profile. Accordingly, the value of these services to the end-user can be significantly greater when the end-user has completed his or her profile by adding his or her skills. Specifically, with a completed profile and accurate list of skills, the end-user is more likely to receive relevant information that is of interest to the end-user.

However, when certain profile information is made optional, there are a variety of reasons that an end-user may be hesitant to add such information to his or her end-user profile. First, an end-user may not appreciate the increased value that he or she will realize from the various online services when his or her profile is complete. Second, an end-user may not understand how to add certain information to his or her profile, or an end-user may simply not want to take the time to add the information to his or her end-user profile. Finally, it may be difficult for an end-user to understand specifically what information—for example, which skills—the end-user should add to his or her end-user profile. Accordingly, many online services prompt end-users to add information to their end-user profile. For example, in the context of a social networking service—particularly a professional social networking service—a profile completion service may prompt end-users to add skills to their respective end-user profiles. However, for a variety of reasons, conventional skill suggestions services fail to satisfy important technical requirements to meet the needs of online services having millions of members.

BRIEF DESCRIPTION OF THE DRAWINGS

Embodiments of the present invention are illustrated by way of example and not limitation in the figures of the accompanying drawings, in which:

FIG. 3 is a user interface diagram showing an example of a user interface that recommends specific skills that an end-user should add to his or her end-user profile, consistent with embodiments of the present invention;

FIG. 4 shows a pair of user interface diagrams illustrating how a click tracking service tracks end-user skill selections for use in training, and in some cases, re-training one or more models for use in ranking skills, according to some embodiments of the present invention;

DETAILED DESCRIPTION

Figure 1:
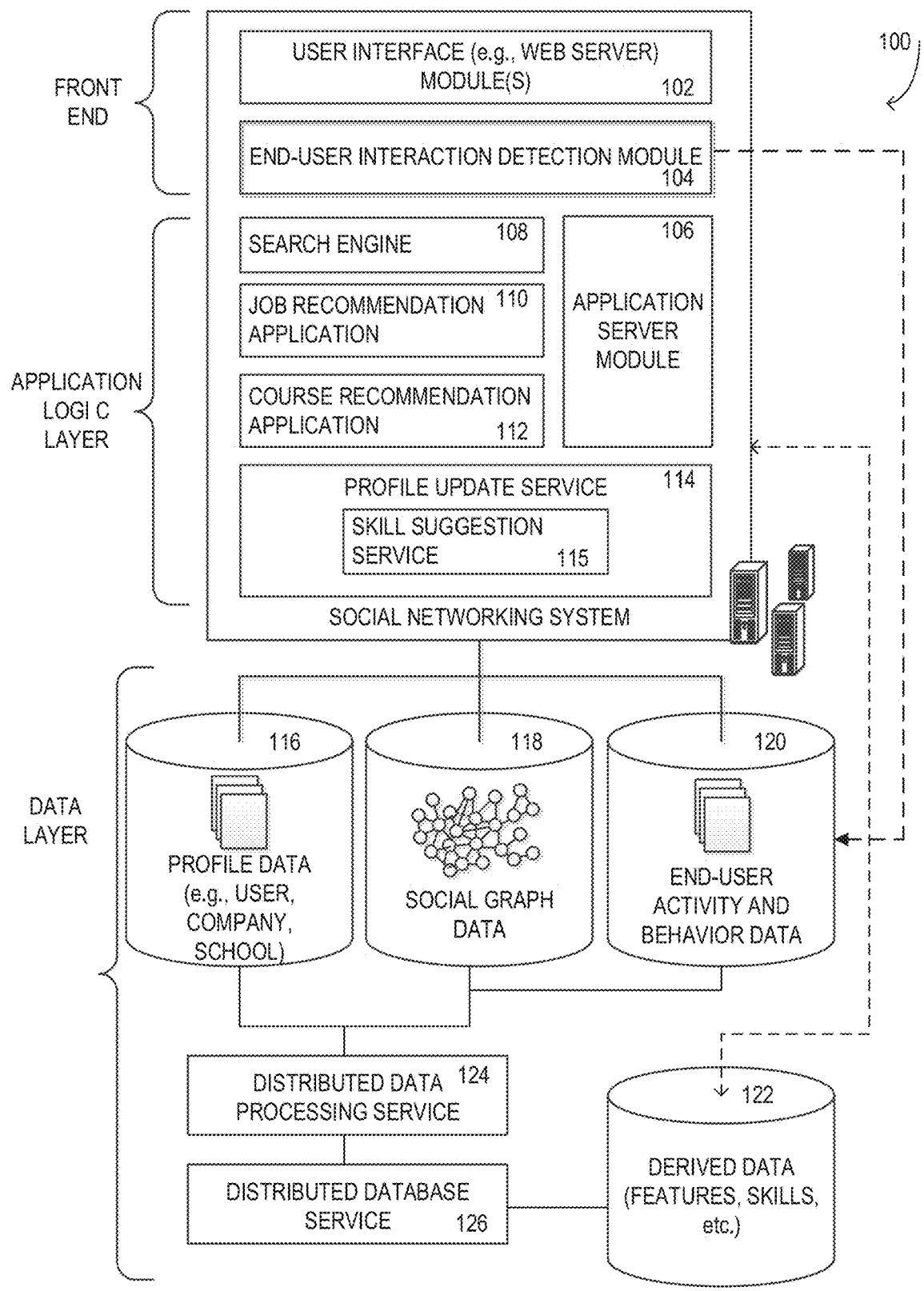
FIG. 1 is a diagram showing an example of the functional components of a social networking service that includes a variety of integrated end-user facing applications and services with which embodiments of the present invention might be implemented.

Described herein are techniques for deploying an ensemble machine-learning technique, wherein the outputs of heterogenous, machine-learned models are combined to rank a set of skills that may be possessed by an end-user of an online service. Some subset of the highest-ranking skills is then presented to the end-user, in some cases with a recommendation that the skills be added to the end-user's profile. The ensemble learning technique described herein involves a concept referred to as "boosting", in which a weaker performing model is enhanced (e.g., "boosted") by a stronger performing model, when ranking the set of skills. Accordingly, by using a combination of models, better results are achieved than might be achieved with either one of the individual models alone. In the following description, for purposes of explanation, numerous specific details and features are set forth in order to provide a thorough understanding of the various aspects of different embodiments of the present invention. It will be evident, however, to one skilled in the art, that the present invention may be practiced and/or implemented with varying combinations of the many details and features presented herein.

Many conventional online services provide their end-users with the ability to add information to their end-user profile when the end-user is first registering to establish an account and use the online service. Additionally, such services may provide access to a specific user interface that allows the end-user to edit and update various aspects of their user profile. However, many conventional online services generally do not provide recommendations or suggestions that specific content be added to an end-user's profile—specifically, skills possessed by the end-user. For those few online services that may recommend or suggest specific skills be added to an end-user's profile, such skill suggestion services tend to be heuristic-based, and therefore lack scalability and personalization.

Heuristic or rule-based recommendation services do not scale well, in large part because of the extremely large number of possible end-users (e.g., millions), the significant variance in the characteristics of the end-users, and the nature of the skills being recommended. For example, end-users may be in different stages of their respective careers, such that some end-users are still students pursuing an educational degree, while other end-users may have a significant number of years of experience working within a specific industry. Moreover, end-users tend to have different experience levels when it comes to interacting and engaging with the online service. For instance, some end-users may be casual end-users of the online service, logging into and engaging with the online service only a few times per year, whereas other end-users may be daily users. Furthermore, the skills being recommended differ significantly. For instance, some skills may be considered "soft" skills, where the bar for determining possession of the skill is quite low, whereas other skills may be considered "hard" skills, such that the bar for determining possession of the skill is quite high. Some skills may be popular or common, such that large groups of end-users are likely to possess these skills, while others are rare, possessed by only a small percentage of end-users. Moreover, as technology and labor requirements change over time, new skills arise, and formerly common skills tend to fade or decrease in popularity. Accordingly, the decision-making process that a person must go through to determine whether he or she possesses a skill will vary significantly from one skill to the next. Consequently, encoding this decision-making process in a set of rules for a heuristic-based skill ranking and recommendation system becomes extremely complex, and does not scale well. Because of all of the variance in characteristics of both end-users and skills, from a technical perspective, it is extremely difficult to implement an efficient, scalable and effective heuristic-based skill suggestion service.

Consistent with embodiments of the present invention, a skill suggestion service utilizes an ensemble machine-learning technique (e.g., an ensemble model) to advantageously address the aforementioned issues. With the ensemble learning technique, the collective behavior of end-users is modeled, for example, by tracking the end-users' interactions with the skills that are suggested by the skill suggestion service. This allows the skill suggestion service to learn the relationship between characteristics of end-users, for instance, as might be set forth in their respective end-user profiles, and the suggested skills that are selected for inclusion in the end-users' profiles via the skill suggestion service. In addition to learning the relationship between skills and characteristics of end-users, the site-wide behavior of end-users can also be modeled and leveraged for suggesting skills. For instance, various social signals derived from an entire ecosystem of applications and services can be used to optimize a click-through rate (CTR) for suggested skills.

In general, deployment of the ensemble learning model involves three distinct stages—training the ensemble model, and specifically, the individual models that comprise the ensemble model, selecting candidate skills, and then ranking the skills in real-time for a particular end-user. Specifically, before the ensemble model can be deployed to rank skills for any end-user, the individual machine-learned models that comprise the ensemble model must be trained. Accordingly, the first stage involves training two separate and distinct models. Consistent with some embodiments, a first model is based on a pair-wise decision tree, while a second model is based on a list-wise, multilayer perceptron (MLP) neural network. As described in greater detail below, click tracking data associated with the skill suggestion service is a primary source of training data used in training the models. Accordingly, training the pair-wise model involves utilizing training data derived from analyzing click tracking data obtained when skills are suggested to the end-user by the skill suggestion service. Specifically, for the pair-wise model, the training data will generally comprise pairs of skills, such that one skill in the pair has been selected for inclusion in an end-user's profile (e.g., a positive example), while the other skill in the pair of skills was not selected (e.g., a negative example). Thus, by training the first model with a sufficiently large volume of training data relating to different pairs of skills and information relating to the end-user to whom the skills were presented, the first model will output a score for any individual skill and end-user, when that skill and a variety of features are provided to the first model as input. The training data for the second model, which is a list-wise model based on a MLP neural network, will include an entire set of skills that have been suggested by the skill suggestion service, where some subset of the suggested skills have been labeled to indicate that those skills were selected by the end-user for inclusion in his or her profile (e.g., positive examples), while the other skills are labeled to indicate that the skills were suggested, but not selected by the end-user (e.g., negative examples). Accordingly, using the listwise approach to train the second model, multiple skills, each labeled as a positive or negative example, are used to train the second model.

After both models are trained and deployed for use by the skill suggestion service, when the skill suggestion service is invoked to generate a set of recommended skills for an end-user, the first step involves identifying a set of candidate skills. With some embodiments, to obtain candidate skills, the skill suggestion service will obtain a set of implicit skills and/or inferred skills. Generally, implicit skills are derived by an implicit skills service by analyzing language used in an end-user's profile to match words with known skills in a skill ontology maintained by the online service. For instance, an end-user may list specific skills, or use language that implies the possession of certain skills, in one or more free form text sections of his or her end-user profile. The implicit skills service will use language processing techniques to analyze portions of an end-user's profile to identify implicit skills of the end-user. Similarly, an inferred skills service determines a set of inferred skills by analyzing other aspects of an end-user's profile, in combination with information associated with an end-user's network of connections as memorialized in a social graph maintained by the professional social networking service. For instance, an inferred skills service may analyze skills possessed by groups of end-users, in the aggregate, who have exhibited certain behaviors (e.g., viewed certain types of job postings, etc.) or have certain characteristics (e.g., employed at certain companies, studied at certain schools, and so on), as evidenced by information in their respective end-user profiles. By identifying certain relationships between skills and these group behaviors and group characteristics, the inferred skills service may conclude that an end-user who has a profile explicitly indicating certain skills, and has exhibited behavior consistent with a particular group, or has other profile attributes that are consistent with a particular group, may have the same or similar skills to those end-users within the specific group.

Consistent with some embodiments, so long as there are a sufficient number of implicit and/or inferred candidate skills for the end-user, the skill suggestion service will proceed to the second step, which involves ranking the candidate skills. However, if the number of implicit and/or inferred skills does not meet some minimum threshold, the skill suggestion service will obtain additional candidate skills via another skill service, referred to herein as a skill utility service. As described in greater detail below, the skill utility service analyzes skills that are in demand in a job marketplace, as evidenced by those skills being referenced in job postings submitted to, or ingested by, a job hosting service accessible to the online service. The skill utility service analyzes various aspects of a large number of job postings to identify skills that are explicitly referenced, and/or implied, using analysis similar to that used by the implicit skills service. Accordingly, if there are an insufficient number of candidate skills obtained for the end-user from the implicit skills service and/or the inferred skills service, the candidate skills are backfilled with additional skills from the skill utility service.

Once a sufficient number of candidate skills are obtained for the end-user, the skill suggestion service obtains a variety of features for use as input to the two machine-learned models. The input features, which include the candidate skills, are then processed by the two models in parallel, such that each model outputs a score for each candidate skill. The two scores for each candidate skill are then combined to establish a final score for each skill, which is then used to rank the candidate skills. Finally, some predetermined number of the highest-ranking skills are presented to the end-user via a user interface, enabling the end-user to simply select one or more skills for inclusion in his or her end-user profile.

One significant advantage to using these two different types of models in ranking skills is that a wider variety of features can be leveraged to rank the skills, as each individual model may generally be better suited to rank skills based on certain types of features. In this case, the pair-wise, decision tree model utilizes hand-crafted features, whereas the MLP neural network-based model leverages a combination of hand-crafted and other features, including entity embeddings from a an end-user's profile. These entity embeddings include such information as the current job title of the end-user, the school that the end-user attended, the company at which the end-user is currently employed, and the industry in which the end-user is employed. Accordingly, the MLP neural network-based model provides the ability to learn relationships between skills and these end-user profile attributes (e.g., entity embeddings) thereby improving the ranking and recommendation of skills. Of course, other specific information from an end-user profile may also be used.

Another advantage to this general approach is that the features used to train the models, and to ultimately rank the skills, can be based on a wide variety of information relating to characteristics of the end-users and behaviors of the end-users. For instance, the features may include both profile information for an end-user, and information relating to specific interactions that an end-user has had with a wide variety of applications and services accessible to and integrated with the online service. Furthermore, by continuously capturing additional training data via tracking end-user click data via the skill recommendations that are made by the skill suggestion service, the pair of models can be periodically re-trained. This allows the overall skill recommendation service to improve over time, while modifying its behavior to reflect trends related to new skills, skills that may be waning, and so forth. This makes the skill recommendation service both personal, as it uses a variety of features directly linked to the end-users for whom skills are being recommended—and scalable to satisfy millions of end-users in a way that a heuristic-based service is not. Other aspects and advantages of the present invention will be readily understood from the description of the various figures that follows.

Embodiments of the present invention are described herein as being implemented in the context of a professional social networking service. However, the present invention may be applicable to any number and variety of online services that utilize the concept of an end-user profile as a digital representation for end-users. Furthermore, while the present invention is described herein as involving the ranking of skills in the context of presenting a ranked set of skills to an end-user with a recommendation or suggestion that one or more skills be added to the profile of the end-user, other embodiments might also be applicable to other profile attributes beyond skills. By way of example, other embodiments of the invention may utilize similar techniques as described herein to suggest to an end-user various interests of the end-user. Accordingly, the express indication of an interest, as evidenced by the interest being added to an end-user profile, might be used in a variety of content recommendation algorithms in order to select and present an end-user with content that is of interest to the end-user. The nature of the interests that may be added to an end-user profile will of course vary from one online service to the next. For instance, in the context of a professional social networking service, an end-user may express interest in topics or specific subject matters that are associated with his or her employment (e.g., computer programming, photography, internal medicine). In the context of an e-commerce marketplace, an end-user may add to his or her profile interests that reflect the products, product categories and/or brands in which the end-user is interested.

FIG. 1 is a block diagram showing the functional components of an online social networking system 100 with which an embodiment of the invention might be implemented. As shown in FIG. 1, a front end may comprise a user interface module (e.g., a web server) 102, which receives requests from various client computing devices and communicates appropriate responses to the requesting client devices. For example, the user interface module(s) 102 may receive requests in the form of Hypertext Transfer Protocol (HTTP) requests or other web-based API requests. In addition, an end-user interaction detection module 104, sometimes referred to as a click tracking service, may be provided to detect various interactions that end-users have with different applications and services, such as those included in the application logic layer of the social networking system 100. As shown in FIG. 1, upon detecting a particular interaction, the end-user interaction detection module 104 logs the interaction, including the type of interaction and any metadata relating to the interaction, in an end-user activity and behavior database 120. Accordingly, data from this database 122 can be further processed to generate data appropriate for training one or more machine-learned models, and in particular, for training models to rank a set of skills for an end-user.

An application logic layer may include one or more application server modules 106, which, in conjunction with the user interface module(s) 102, generate various user interfaces (e.g., web pages) with data retrieved from various data sources in a data layer. Consistent with some embodiments, individual application server modules 106 implement the functionality associated with various applications and/or services provided by the online social networking system 100. For instance, as illustrated in FIG. 1, the application logic layer includes a variety of applications and services to include a search engine 108, a job recommendation application 110, an online course recommendation application 112, and a profile update service 114. The various applications and services illustrated as part of the application logic layer are provided as examples and are not meant to be an exhaustive listing of all applications and services that may be integrated with and provided as part of a social networking service. For example, although not shown in FIG. 1, a social networking system 100 may also include a job hosting service via which end-users submit job postings that can be searched by end-users, and/or recommended to other end-users by the job recommendation application 110. As end-user's interact with the various user interfaces and content items presented by these applications and services, the end-user interaction detection module 104 detects and tracks the end-user interactions, logging relevant information for subsequent use in training one or more models that are used in ranking skills of an end-user.

As shown in FIG. 1, the data layer may include several databases, such as a profile database 116 for storing profile data, including both end-user profile data and profile data for various organizations (e.g., companies, schools, etc.). Consistent with some embodiments, when a person initially registers to become an end-user of the online social networking service, the person will be prompted by the profile update service 114 to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 116. Similarly, when a representative of an organization initially registers the organization with the online social networking system 100, the representative may be prompted to provide certain information about the organization. This information may be stored, for example, in the profile database 116, or another database (not shown).

Once registered, an end-user may invite other end-users, or be invited by other end-users, to connect via the online social networking system 100. A "connection" may constitute a bilateral agreement by the end-users, such that both end-users acknowledge the establishment of the connection. Similarly, with some embodiments, an end-user may elect to "follow" another end-user. In contrast to establishing a connection, the concept of "following" another end-user typically is a unilateral operation and, at least with some embodiments, does not require acknowledgement or approval by the end-user that is being followed. When one end-user follows another, the end-user may receive status updates relating to the other end-user, or other content items published or shared by the other end-user user who is being followed. Similarly, when an end-user follows an organization, the end-user becomes eligible to receive status updates relating to the organization as well as content items published by, or on behalf of, the organization. For instance, content items published on behalf of an organization that an end-user is following will appear in the end-user's personalized feed, sometimes referred to as a content feed or news feed. In any case, the various associations and relationships that the end-users establish with other end-users, or with other entities (e.g., companies, schools, organization) and objects (e.g., metadata hashtags ("#topic") used to tag content items), are stored and maintained within a social graph in a social graph database 118.

As end-users interact with the various content items that are presented via the applications and services of the online social networking system 100, the end-users' interactions and behaviors (e.g., content viewed, links or buttons selected, messages responded to, job postings viewed, etc.) are tracked by the end-user interaction detection module 104, and information concerning the end-users' activities and behaviors may be logged or stored, for example, as indicated in FIG. 1 by the end-user activity and behavior database 120.

Consistent with some embodiments, data stored in the various databases of the data layer may be accessed by one or more software agents or applications executing as part of a distributed data processing service 124, which may process the data to generate derived data. The distributed data processing service 124 may be implemented using Apache Hadoop® or some other software framework for the processing of extremely large data sets. Accordingly, an end-user's profile data and any other data from the data layer may be processed (e.g., in the background or offline) by the distributed data processing service 124 to generate various derived profile data. As an example, if an end-user has provided information about various job titles that the end-user has held with the same organization or different organizations, and for how long, this profile information can be used to infer or derive an end-user profile attribute indicating the end-user's overall seniority level or seniority level within a particular organization. This derived data may be stored as part of the end-user's profile or may be written to another database.

In addition to generating derived attributes for end-users' profiles, one or more software agents or applications executing as part of the distributed data processing service 124 may ingest and process data from the data layer for the purpose of generating training data for use in training various machine-learned models, and for use in generating features for use as input to the trained models. For instance, profile data, social graph data, and end-user activity and behavior data, as stored in the databases of the data layer, may be ingested by the distributed data processing service 124 and processed to generate data properly formatted for use as training data for training one of the aforementioned machine-learned models for ranking skills. Similarly, the data may be processed for the purpose of generating features for use as input to the machine-learned models when ranking skills for a particular end-user. Once the derived data and features are generated, they are stored in a database 122, where such data can easily be accessed via calls to a distributed database service 124.

Figure 2:
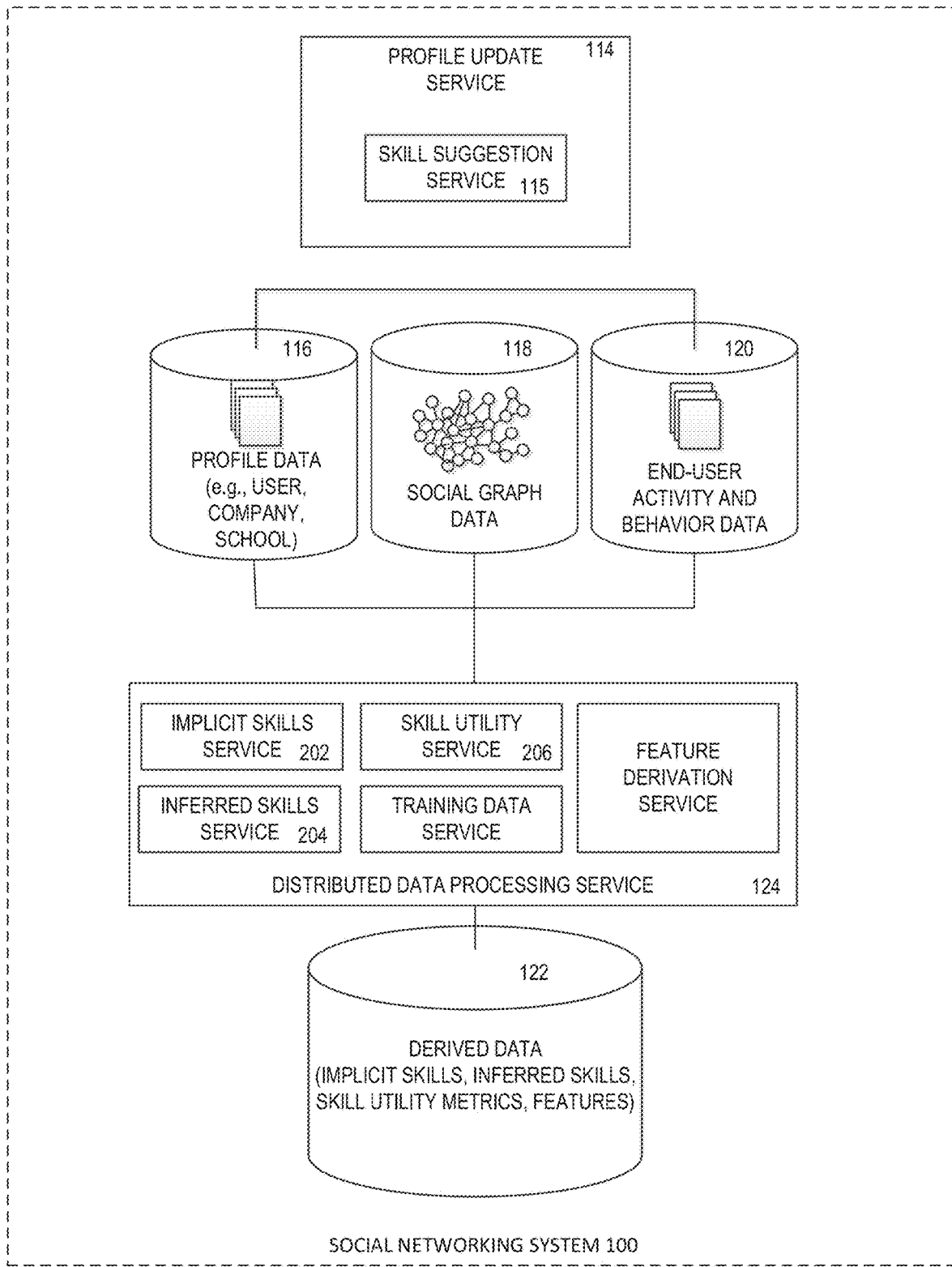
FIG. 2 is a diagram showing an example of several functional components that specifically facilitate the ensemble machine learning technique described herein, for example, by processing data to derive potential candidate skills for ranking and recommending to end-users, consistent with embodiments of the present invention.

Referring now to FIG. 2, some of the specific functional modules comprising the distributed data processing service 124 are shown. By way of example, on some periodic basis, an implicit skills service 202, executing as a part of the distributed database processing service 124, may ingest end-user profile information (e.g., from database 116) for the purpose of analyzing the information to identify possible skills that an end-user may possess, based on language included in certain portions of the end-user's profile. For instance, this analysis may be based on identifying keywords, combinations of keywords, and/or the frequency of words appearing in an end-user's profile, in combination with other information about the end-user, to include his or her job title, company of employment, industry, and so forth. The output of the analysis resulting from the implicit skills service may be a list of candidate skills, which are written to the database with reference 122 for subsequent use by the skill suggestion service 215. The implicit skills service 202 may batch process the data to derive candidate skills for all end-users of the online service, on some periodic basis.

In addition to the implicit skills service 202, the distributed data processing service 124 may include an inferred skills service 204 that ingests and processes profile data, social graph data, and other data from the data layer for the purpose of deriving for each end-user a set of inferred skills. Whereas implicit skills are generally based on analysis of language provided by an end-user in his or her profile, inferred skills are derived by analyzing relationships between explicitly identified skills of end-users, other profile attributes or characteristics, information relating to end-users' behaviors, and in some instances, profile information of direct connections (e.g., first-degree connections) of an end-user. For instance, an inferred skills service 204 may analyze all skills listed by end-users that share certain characteristics or profile attributes (e.g., job title, company of current employment, industry, and so forth). By analyzing the skills listed by end-users in the aggregate, the inferred skills service can infer that one end-user has or possesses certain skills based on that end-user sharing in common certain profile characteristics with other groups of end-users who also indicate having those characteristics or profile attributes. For instance, it may be the case that a significant percentage of end-users who list in their end-user profiles a specific combination of job title (e.g., data scientist), school (e.g., State University), and industry, (e.g., Internet) tend to possess one or more specific skills (e.g., computer programming, Python, etc.). Accordingly, based on analyzing this profile information in the aggregate, the inferred skills service may infer that an end-user listing certain profile characteristics or profile attributes also possesses the specific skills. Similarly, the inferred skills service may analyze the profile information of the first-degree or direct connections of an end-user and draw inferences about the skills of the end-user based on this information.

Consistent with some embodiments, the implicit skills service 202 and the inferred skills service 204 are two of many software agents or applications that execute periodically, as part of the distributed data processing service 124, to update a database (e.g., database 122). Accordingly, at run time, when the profile update service 114 and skill suggestion service 115 are invoked, the candidate skills for an end-user will have been pre-computed and will be available to the skill suggestion service 115 via a call or request to a distributed database service 126.

In many instances, particularly with new end-users—that is, end-users who have only recently registered to use the social networking system—the end-users will not have a sufficiently completed end-user profile, and/or will not have a sufficient number of direct connections in order for the implicit skills service and/or the inferred skills service to derive a sufficient number of candidate skills to be ranked by the skill suggestion service. Accordingly, with some embodiments, when the combination of implicit skills and inferred skills for an end-user does not meet the predetermined minimum number (e.g., ten), candidate skills may be obtained from a skill utility service.

Consistent with some embodiments, the skill utility service 206 is a service that, similar to the implicit skills service 202 and inferred skill service 204, may execute as part of the distributed data processing service 124. The primary purpose of the skill utility service 206 is to generate sets of candidate skills for end-users having various combinations of characteristics. The skill utility service 206 generates a set of skills, based at least in part on the popularity of skills, as measured by the frequency with which certain skills are referenced within job postings hosted by a job hosting service, during some predefined duration of time. The skill utility scores for skills may be defined for different combinations of profile characteristics (e.g., entities), such as different occupations or job titles, different job functions or roles, and different industries. For each specific characteristic or entity, or for varying combinations of the characteristics or entities, a measure of skill utility, $W_i$ (e.g., popularity of the skill), may be derived as follows, $$W_i = \text{\# of job postings in the entity having } skill_i \times \log \frac{\text{\# of entities}}{\text{\# of entities having } skill_i}$$

Accordingly, the skill utility score, W, for a skill, i, is the number of job postings that exhibit certain characteristics or entities (e.g., occupation, role, industry, etc.) and which reference the skill, multiplied by the log of the total number of end-users exhibiting or having the characteristics, divided by the number of end-users who exhibit the characteristics and possess the skill. For a certain combination of characteristics or entities, the skill utility service 206 will compute a skill utility score for some set of skills. By ranking the skills by their skill utility score, the most popular or frequently referenced skills for a specific set of characteristics (entities) can be ascertained.

Consistent with some embodiments, the specific characteristics or combinations of characteristics for which skill utility metrics are derived may be associated with certain categories of end-users. For instance, with some embodiments, end-user profile information and end-user activity and behavior data are used to classify each end-user into one of several groups or verticals. For instance, consistent with some embodiments, end-users may be classified as belonging to one of several different verticals, to include, for example, members, recruiters, or advertisers, with each vertical representing a primary activity undertaken by those end-users in the vertical. For instances, members may exhibit a first set of behaviors, whereas recruiters will tend to exhibit a second set of behaviors reflecting their desire and intention to recruit other end-users to fill job postings, etc. Based on these classifications, different combinations of member profile characteristics (i.e., entities) may be used to group job postings that are analyzed for purposes of deriving the skill utility metrics for the skills. For instance, for members, the characteristics or entities from the member profile used to select job postings for purposes of deriving the skill utility metrics may be a combination of occupation, role and industry. In any case, for each vertical—that is, for different classifications of end-users—a different set of job postings corresponding with the vertical may be selected for purposes of deriving the skill utility metrics. The end result is different sets of top candidate skills by varying characteristics of end-user profiles.

Because some end-users may not have completed profiles, and may be generally inactive, a default set of skill utility scores may be derived without regard for any specific profile characteristics or entities. For instance, the skill utility scores may be derived based on the number of job postings having or referencing the skill. The result is a list of the most popular, or frequently requested skills, as evidenced by analyzing job postings that are active, or have been active, over some predetermined period of time.

Accordingly, the skill utility metric for each skill represents a popularity of a skill with respect to job postings that share in common some combination of characteristics. When candidate skills have been requested for a particular end-user, characteristics of the end-user are used to match the end-user with one of several verticals of end-users. For each vertical, some different combination of skill utility metrics have been pre-computed. Accordingly, the skills having the highest skill utility scores for the particular vertical of the end-user are returned as candidate skills for the end-user. If, however, the end-user cannot be classified into one of the verticals, for example, because the end-user is a new end-user, a default set of skills with the highest overall skill utility scores, independent of any end-user classification, are returned. The candidate skills obtained from the skill utility service 206 are used to backfill any previously obtained candidate skills from the implicit skills service 202 and/or the inferred skills service 204, to ensure that the total number of candidate skills being ranked is equal to or greater than some predetermined threshold number (e.g., ten).

FIG. 3 is a user interface diagram showing an example of a user interface 300, for a skill suggestion service, that recommends specific skills that an end-user should consider adding to his or her end-user profile, consistent with embodiments of the present invention. As illustrated in the example user interface 300, ten individual skills are presented in the user interface. Of course, in various alternative embodiments, some other number of skills may be suggested. Each skill is presented as a separate and end-user selectable user interface element. For instance, the first skill, "Apache Spark," 302 is shown with a plus symbol ("+") to indicate that an end-user can select the user interface element 320 to add the skill to his or her end-user profile.

As shown in FIG. 3, the ten highest ranking skills are shown in three distinct rows, stretching horizontally across the user interface, and as such, their relative rank is not easily ascertained by the end-user. With some alternative embodiments, the skills may be presented as a single list, presented in an order from top to bottom by their rank. However, it is important to point out that the position of the skills in the user interface—at least in some instances—has the potential to influence their selection by an end-user, and thereby introduce into the training data something referred to as position bias. Position bias stems from the idea that a person is more likely to select a content item that is presented more prominently, for example, at or near the top of a list. In order to prevent position bias, the skill suggestion service 115 may randomize the order in which the skills are presented in the user interface for some percentage of end-users, for the purpose of obtaining training data that does not exhibit position bias. For instance, the training data for the skill suggestion service may be obtained from the results of the randomized skills presented to the end-users. Accordingly, by randomizing the order in which the skills are presented, the skill suggestion service 115 can obtain training data while counteracting any bias that would otherwise result from positioning of the skills in the user interface by their respective ranking.

Presentation bias, another problem that arises in machine learning systems, is the result of some skills being presented more frequently, for example, because certain skills are simply more popular or commonly possessed. For instance, a skill that is not presented, or a skill that is presented infrequently, will not ultimately be selected frequently. Consistent with some embodiments, in order to eliminate presentation bias, the skill suggestion service will not only randomize the position in which skills are presented, but may randomly include skills in the list of presented skills, such that the skills would not otherwise have been selected for presentation to the end-user. Again, by randomly selecting skills to be included in the presentation of the suggested skills for some percentage of end-users, the suggested skills service can obtain training data from the results of presenting randomized skills to end-users, and thus counteract what is frequently referred to as presentation bias.

FIG. 4 shows a pair of user interface diagrams illustrating how an end-user interaction detection module, or, click tracking service, tracks end-user skill selections for use in training, and in some cases, re-training one or more models for use in ranking skills, according to some embodiments. As illustrated in FIG. 4, the top user interface is identical to that presented in FIG. 3. However, after an end-user has selected three specific skills from the user interface 300 to add to his or her end-user profile, the user interface is updated to properly identify the skills as having been selected for inclusion in the end-user profile of the end-user. As shown in FIG. 4, the three skills with reference numbers 402, 404, and 406 are shown with check marks to indicate that they have been selected and thus added to the end-user's profile.

As illustrated in the bottom portion of FIG. 4, with reference number 408, as a result of the end-user's skill selections, there is a set of labeled skills for use as training data to train one or more machine-learned models to rank skills. Specifically, as shown in FIG. 4, the labeled training data consists of a list of the skills that were presented by the skill suggestion service, labeled with a corresponding one ("1") to indicate that a skill was selected for adding to the end-user's profile, or a corresponding zero ("0") to indicate that the skill was presented, but not selected. Accordingly, a skill that has been labeled as one ("1") represents a positive example, whereas a skill labeled as zero ("0") represents a negative example. This training data is associated with various additional features associated with the end-user to whom the skills were presented in order to train the models and identify relationships between end-user characteristics and behaviors, and skills.

Figure 5A:
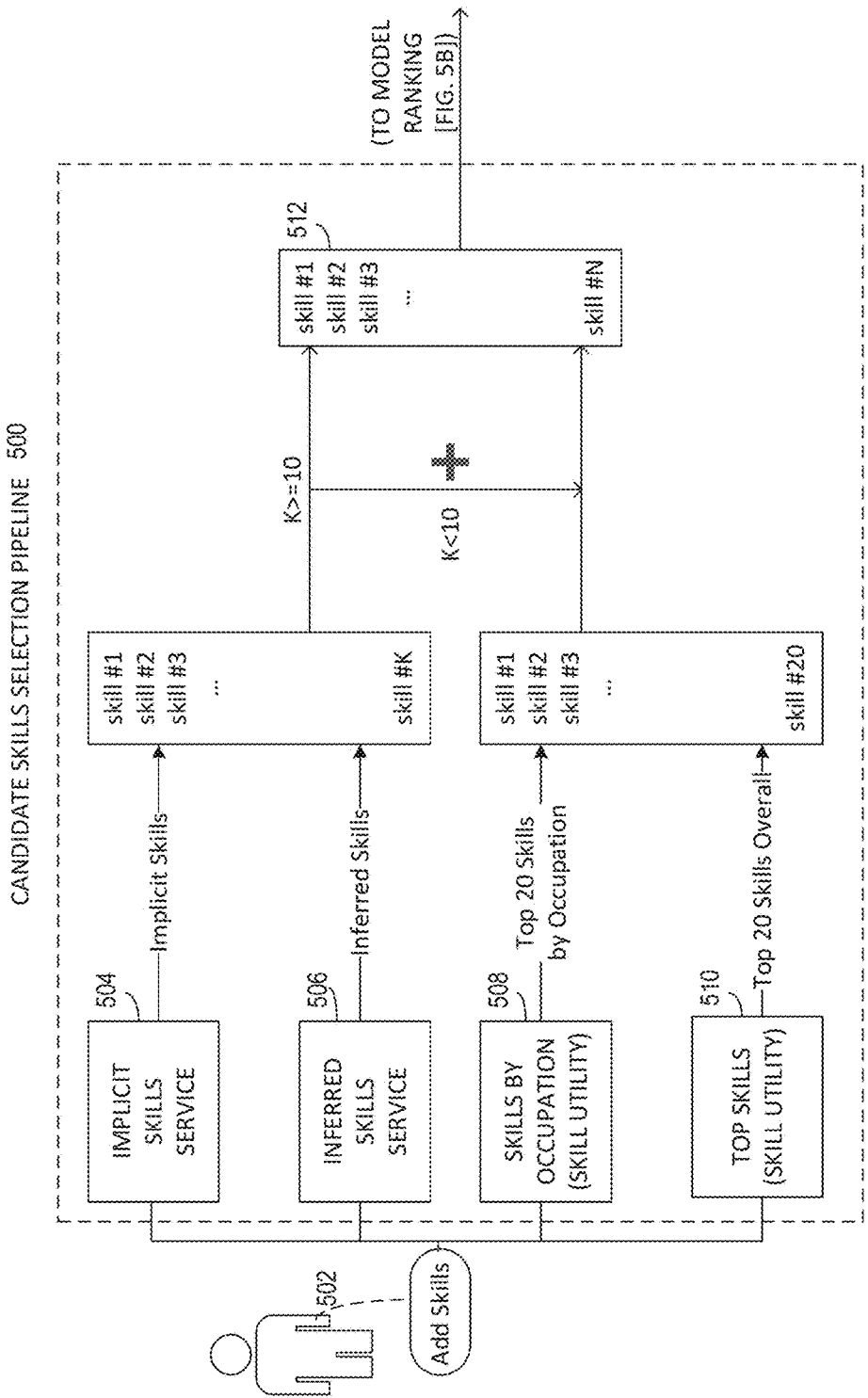
FIGS. 5A and 5B are diagrams illustrating an overview of a system architecture for deploying machine learned models for ranking and recommending skills to an end-user, consistent with embodiments of the invention.
Figure 5B:
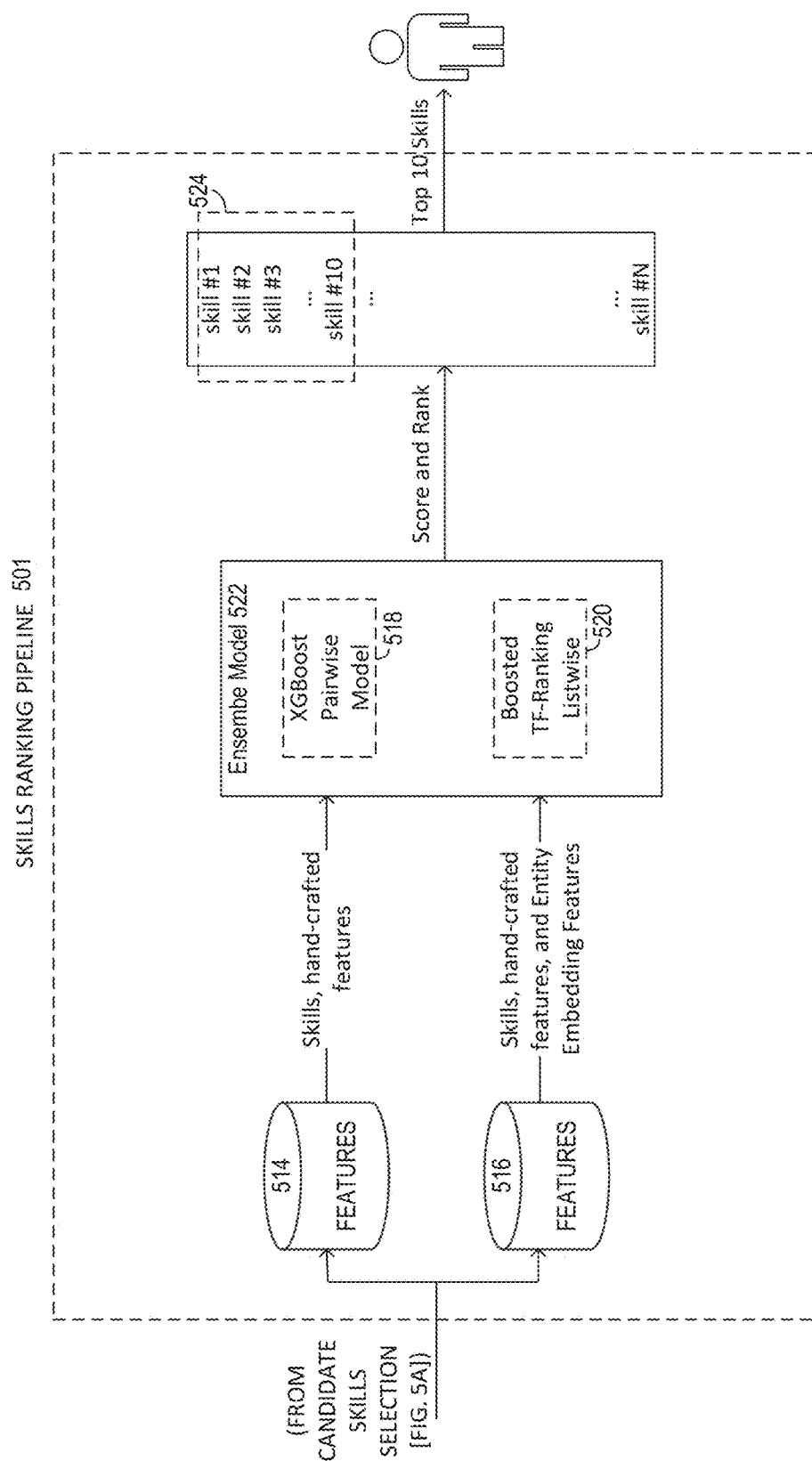

FIGS. 5A and 5B are diagrams illustrating an overview of a system architecture for deploying an ensemble machine-learned model for ranking skills and recommending skills to an end-user, consistent with embodiments of the invention. Generally, the system architecture consists of an online data processing pipeline that includes two distinct parts—a candidate skills selection pipeline (FIG. 5A), and a model-based, skills ranking pipeline (FIG. 5B). The primary function of the candidate skills selection pipeline 500 is to obtain an initial set of candidate skills to be ranked, whereas the primary function of the model-based, skills ranking pipeline 600 is to rank the candidate skills, so that some predetermined number (e.g., ten) of highest-ranking skills can be presented to an end-user, with a recommendation or suggestion that the skills be added to the profile of the end-user.

Referring now to FIG. 5A, an end-user has invoked a profile update service by interacting with a user interface of the social networking service. For instance, the end-user may have selected a specific user interface element (e.g., a button) that caused the profile update service to be invoked. Alternatively, the online service may periodically, or upon detecting some specific event or end-user interaction, invoke the profile update service and proactively request or prompt the end-user to update his or her end-user profile. During the end-user's interaction with the profile update service, the end-user may elect to update his or her skills, for instance, by selecting a specific user interface element (e.g., a button) 502 that invokes the skill suggestion service. In any case, as a result of an end-user invoking the skill suggestion service, the skill suggestion service will first obtain a set of candidate skills.

Accordingly, the skill suggestion service first makes a request to obtain a set of implicit skills 504 for the end-user. As described above, the implicit skills are those skills derived by an implicit skills service that periodically executes an algorithm to generate a list of skills that the end-user is likely to possess based on language used in the end-user's profile. Consistent with some embodiments, if the call for implicit skills results in a sufficient number of candidate skills, then the skill suggestion service will immediately proceed to ranking the candidate skills. For example, as illustrated in FIG. 5A, consistent with some embodiments, if an end-user has ten or more implicit skills for use as candidate skills (e.g., k=>10, as shown in FIG. 5A), the skill suggestion service will immediately proceed to ranking the candidate skills. However, when the call for implicit skills results in fewer than some predetermined number of candidate skills, the skill suggestion service will make a subsequent call to obtain a set of inferred skills for the end-user. Of course, with some embodiments, the calls for implicit skills and inferred skills may be made in parallel. In any case, if the number of implicit skills and/or combination of implicit skills and inferred skills exceeds some predetermined threshold, then the skill suggestion service will proceed to the ranking the obtained candidate skills.

In certain circumstances, specifically with end-users who are new to the online service, or with end-users who rarely use the online service, there may be insufficient information to generate a number of implicit and inferred skills for ranking. In such instances, for example, when the number of implicit skills and inferred skills for the end-user is less than the predetermined threshold, the skill suggestion service will make an additional request for candidate skills derived via the skill utility service. As described above, the skill utility service generates sets of candidate skills, based on certain combinations of end-user characteristics. For instance, different sets of candidate skills may be derived for different occupations, as noted by job titles, roles or job functions, industries, and so forth. Accordingly, if an end-user has sufficient information in his or her end-user profile to match the end-user with a set of characteristics for which a set of candidate skills has been generated by the skill utility service, then those skills are requested and obtained by the skill suggestion service. For instance, the skill suggestion service may request the candidate skills associated with an occupation 508, assuming the end-user has sufficient information in his or her end-user profile to determine a corresponding occupation. The candidate skills that are obtained via the skill utility service are then used to backfill any previously obtained implicit skills and/or inferred skills. For instance, assuming the threshold number of skills is ten, if the skill suggestion service has obtained seven candidate skills from the implicit skills and inferred skills, the top three skills by occupation from the skill utility service would backfill the candidate skills, resulting in ten total skills.

In certain instances, an end-user may not have sufficient information in his or her end-user profile to match the end-user with a set of skills derived by the skill utility service for some specific combination of characteristics—for example, skills by occupation. When this occurs, the skill suggestion service will obtain a set of default candidate skills 510 generated by the skill utility service, without regard for any specific end-user characteristics. Accordingly, the skill suggestion service will make a series of data requests until it has obtained a sufficient number of candidate skills—that is, a number of candidate skills that equals or exceeds some predetermined threshold.

Referring now to FIG. 5B, once the skill suggestion service has obtained a sufficient number of candidate skills to be ranked for the end-user, the skill suggestion service will obtain features 514 and 516 for use as input to the pair of models 518 and 520, which together comprise an ensemble model 522. As will be readily understood by those skilled in the art, the exact number and nature of the features may vary widely from one implementation or embodiment to the next. Furthermore, there may be significant overlap in the features that are used with each machine-learned model; however, consistent with some embodiments, the combination of features used by each specific model may vary.

Consistent with some embodiments, the features may include skill utility scores for skills, as generated by the aforementioned skill utility service. Features may also include information relating to the co-occurrence of skills within an individual end-user profile (e.g., using pointwise mutual information, or PMI). Other features may be derived from information related to a skill ontology. For example, the online service may maintain and manage a skill ontology, via which skills may be organized into various groups or otherwise characterized or classified. Specifically, with some embodiments, skills may be classified as "hard" skills or "soft" skills, and such information may be included as input features for ranking. Finally, with some embodiments, various information from an end-user profile may be used as features for ranking. Specifically, features may include information indicating a job title of the end-user, one or more schools that the end-user attended and/or from which the end-user graduated, a company or organization at which the end-user is currently employed, and an industry in which the end-user is currently employed. Of course, a variety of other end-user profile attributes may also be used as input features for the ranking models.

Once the features have been obtained, for each individual skill included in the final list of candidate skills 512, the skill and relevant features are applied in parallel to the two models 518 and 520, which individually generate a score for the skill. Consistent with some embodiments, the XGBoost Pairwise model 520 receives hand-crafted features with each skill, whereas the Boosted TF-Ranking Listwise model 520 receives the same hand-crafted features as provided to the XGBoost Pairwise model 520, but also one or more entity embedding features derived from profile attributes of the end-user's profile. Specifically, with some embodiments, the Boosted TF-Ranking Listwise model 518 receives entity embeddings relating to and representing the current job title of the end-user, the school that the end-user attended, the company at which the end-user is currently employed, and the industry in which the end-user is employed. The individual scores for a skill, as generated by each individual model 518 and 520, are then combined to derive a final score for the skill. Once a final score has been derived for each skill in the final list of candidate skills 512, the skills are ranked by their respective scores and some predetermined number of highest ranking skills (e.g., the top ten skills, as indicated by the bounding box with reference number 524) are selected for presentation to the end-user. With some embodiments, presentation of the highest ranking skills to the end-user will include a recommendation or suggestion that the end-user select one or more of the presented skills for inclusion with his or her member profile.

While the individual steps described in connection with the candidate skills selection pipeline 500 and skills ranking pipeline 501 have been described as occurring sequentially, it is worth pointing out that in various embodiments, many of the individual processing steps may, when possible, occur in parallel. For example, the requests associated with obtaining candidate skills and input features may be executed in parallel, such that, as a result of the end-user invoking the skills suggestion service, the candidate skills and the various features used by the individual models are fetched or obtained in parallel.

As illustrated in FIG. 5B, the machine-learned model with reference number 518 is based on an optimized, distributed gradient boosting library referred to as XGBoost, which utilizes a gradient boosting framework with a parallel decision tree algorithm. In this instance, the model has been trained as a pairwise model, where each instance of training data includes a pair of skills—one labeled to indicate it is a positive example, and one labeled to indicate it is a negative example. As a pairwise model, the learning-to-rank problem is approximated by a binary classification problem, in which the goal is to train the model 518 to classify the skills in a pair of skills by assigning one skill a higher score, while minimizing the number of inversions—that is, the number of times the model generates output scores that are inconsistent with the training data.

Consistent with some embodiments, the machine-learned model with reference number 520 is based on a multilayer perceptron (MLP) neural network, implemented using an open-source library referred to as TensorFlow. The model 520 is a listwise model. For example, the training data used to train the model comprises lists of skills, where each skill in the list is associated with a label indicating it is a positive or negative example. Furthermore, as a neural network, the model 520 provides a mechanism by which the relationship between profile attributes of end-users (e.g., school attended, current job title, current company of employment) relate to skills that end-users add to their end-user profiles. For instance, the model 520 includes entity embeddings representing these certain profile attributes. Therefore, the skill suggestion service can leverage these profile attributes in ranking and suggesting skills, where doing so would be more difficult to implement using a model based solely on a decision tree algorithm.

Consistent with some embodiments, each model may be independently trained, and then the output of the models combined (e.g., summed)—a technique known in the art and generally referred to as boosting. However, with some embodiments, one or the other models may be trained first, such that the training of the second model will be dependent upon the results of training the first model. This may be achieved using a technique known in the art as stacking. Stacking is an ensemble learning technique that combines multiple machine-learned models via a meta-model. The base level models (e.g., models 518 and 520 in FIG. 5B) are trained based on a complete training set, then the meta-model is trained using the combined outputs of the base level models as features (e.g., inputs). Using a stacking technique, a learned weighting factor may be applied to the output of one model before the outputs of each model are combined (e.g., summed).

Figure 6:
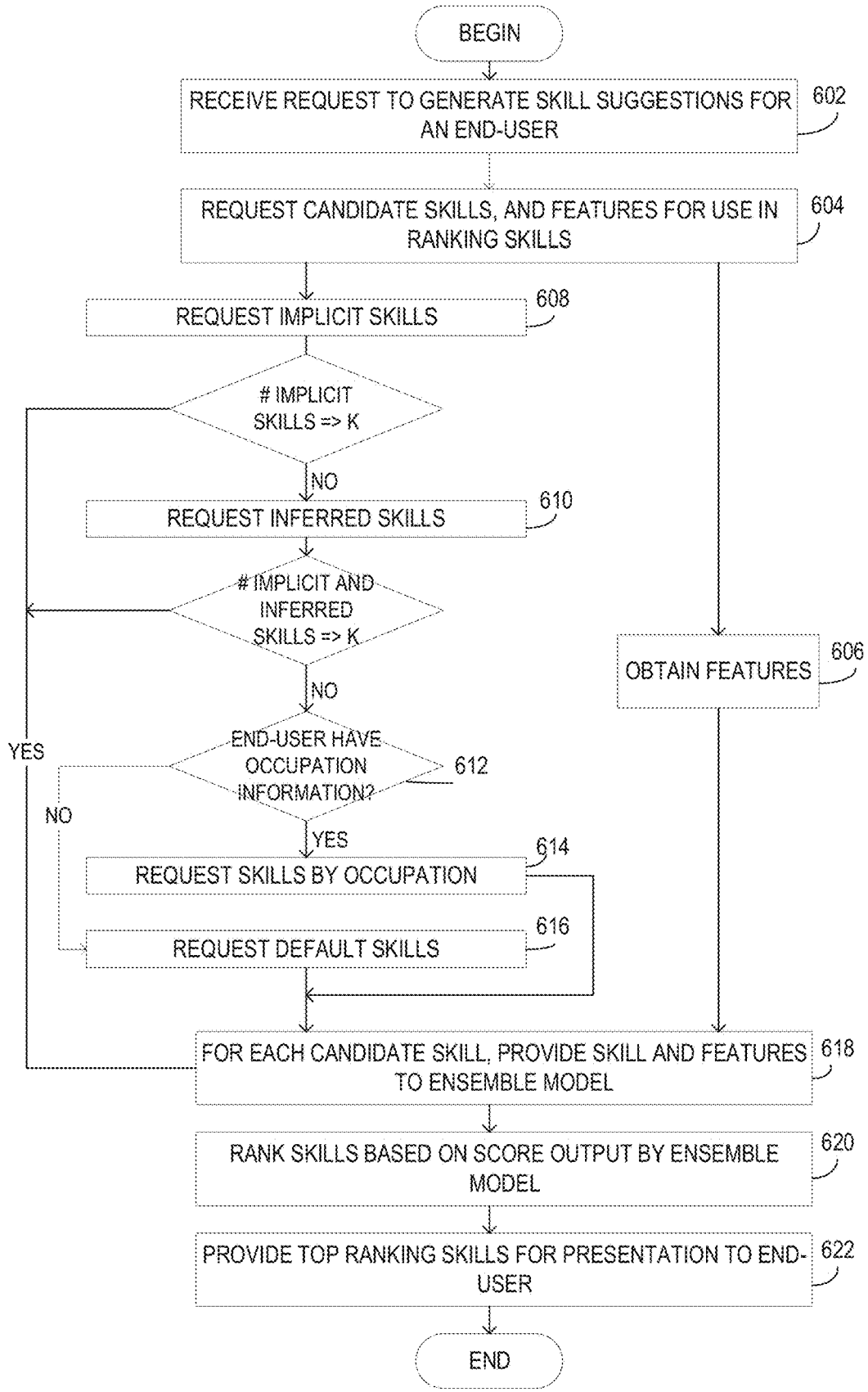
FIG. 6 is a flowchart diagram illustrating an example of the operations for ranking and recommending skills, consistent with embodiments of the invention.

FIG. 6 is a flowchart diagram illustrating an example of the operations for ranking and recommending skills, consistent with embodiments of the invention. As indicated in FIG. 6, at method operation 602, the skill suggestion service receives a request to generate a ranked list of skills for a specific end-user. Next, at method operation 604, the skill suggestion service simultaneously initiates a first request for a set of candidate skills, and a second request for features for the end-user for use in ranking the candidate skills. As shown in FIG. 6 by the parallel paths, these requests are processed in parallel, such that, at method operation 606, the feature information is obtained by the skill suggestion service, while simultaneously (e.g., in parallel), at method operation 608, the skill suggestion service requests implicit skills, generated by the implicit skills service, for the end-user. If the number of implicit skills returned to the skill suggestion service for use as candidate skills is less than some predetermined threshold (e.g., designated here as, "K"), then the skill suggestion service makes a request for inferred skills, derived via an inferred skills service, at method operation 610. In some embodiments, the request for inferred skills and the request for implicit skills may be made in parallel as well. If the number of combined implicit skills and inferred skills is less than the predetermined threshold (e.g., "K"), then at method operation 612, a determination is made as to whether the end-user has sufficient profile information to request skills by occupation. For example and consistent with some embodiments, the operation with reference number 612 involves determining whether the end-user has indicated in his or her end-user profile one or more specific end-user profile attributes, or some specific combination of end-user profile attributes, such as the current company at which the end-user is employed, the job title of the end-user, the industry in which the end-user is employed, and so forth. If, at method operation 612, a determination is made that the end-user does have sufficient profile information, then at method operation 614 a request is directed to the skill utility service for candidate skills, based on the end-user's occupation, as determined via information from the end-user's profile attributes. For example, based on the request made to the skill utility service, the skill utility service may return a list of skills commonly associated with all end-users who share a similar occupation, as determined by the end-user profile attributes that the end-user shares in common with a group of end-users who exhibit the same profile attributes. The skills returned as a result of method operation 614 are then used to backfill any previously obtained candidate skills, to ensure that the total number of candidate skills meets or exceeds the predetermined threshold. For instance, if the combined number of implicit and inferred skills obtained from operations 608 and 610 is less than the threshold number ("K") by some amount X, then a number of skills from the skill utility service equaling K minus X is used to supplement the skills obtained from operations 608 and 610.

If, however, the end-user does not have sufficient profile information to determine an occupation, then a set of default skills are requested at method operation 616. For example, if, as a result of method operation 612, a determination is made that the end-user has not indicated certain profile attributes in his or her end-user profile, then at method operation 616 a request is made to the skill utility service for some default set of skills. Again, the default skills returned from the skill utility service as a result of operation 616 are used to backfill any previously obtained skills from the implicit skills service (e.g., operation 608) and inferred skills service (e.g., operation 610). Consistent with some embodiments, the list of default skills returned by the skill utility service will always meet the threshold number (e.g., "K"), which ensures that all end-users will be presented with some predetermined number of skills by the skill suggestion service. This improved the overall end-user experience, particularly for new end-users, as well as end-users who infrequently engage with the online service.

Once the skill suggestion service has obtained a number of candidate skills equal to or greater than the threshold number (e.g., "K"), for each candidate skill in the final set of candidate skills, an individual candidate skill and corresponding input features are provided as input to the ensemble model. As the ensemble model (e.g., model 522 in FIG. 5B) is a combination of two individual models, with some embodiments, some subset of the features may be applied to one model, and not the other. For example, as indicated in FIG. 5B, with some embodiments, a first model, based on a gradient boosted decision tree (e.g., model 518 in FIG. 5B) may receive hand-crafted features, whereas a second model, based on a deep neural network, may receive the same hand-crafted features in addition to certain entity embeddings that represent specific end-user profile attributes.

At method operation 620, after a score has been generated for each candidate skill, the skills are ranked based on their respective scores as output by the ensemble, machine-learned ranking model. Finally, at method operation 622, some predetermined number of the top-ranking skills are selected for presentation to the end-user in a user interface that may (optionally) prompt the end-user to add one or more skills to his end-user profile. Accordingly, in presenting the end-user with the top-ranking skills, each skill may be user-selectable, such that, when the end-user takes action to select the skill via the end-user interface, the selected skill will be added to his or her end-user profile.

Figure 7:
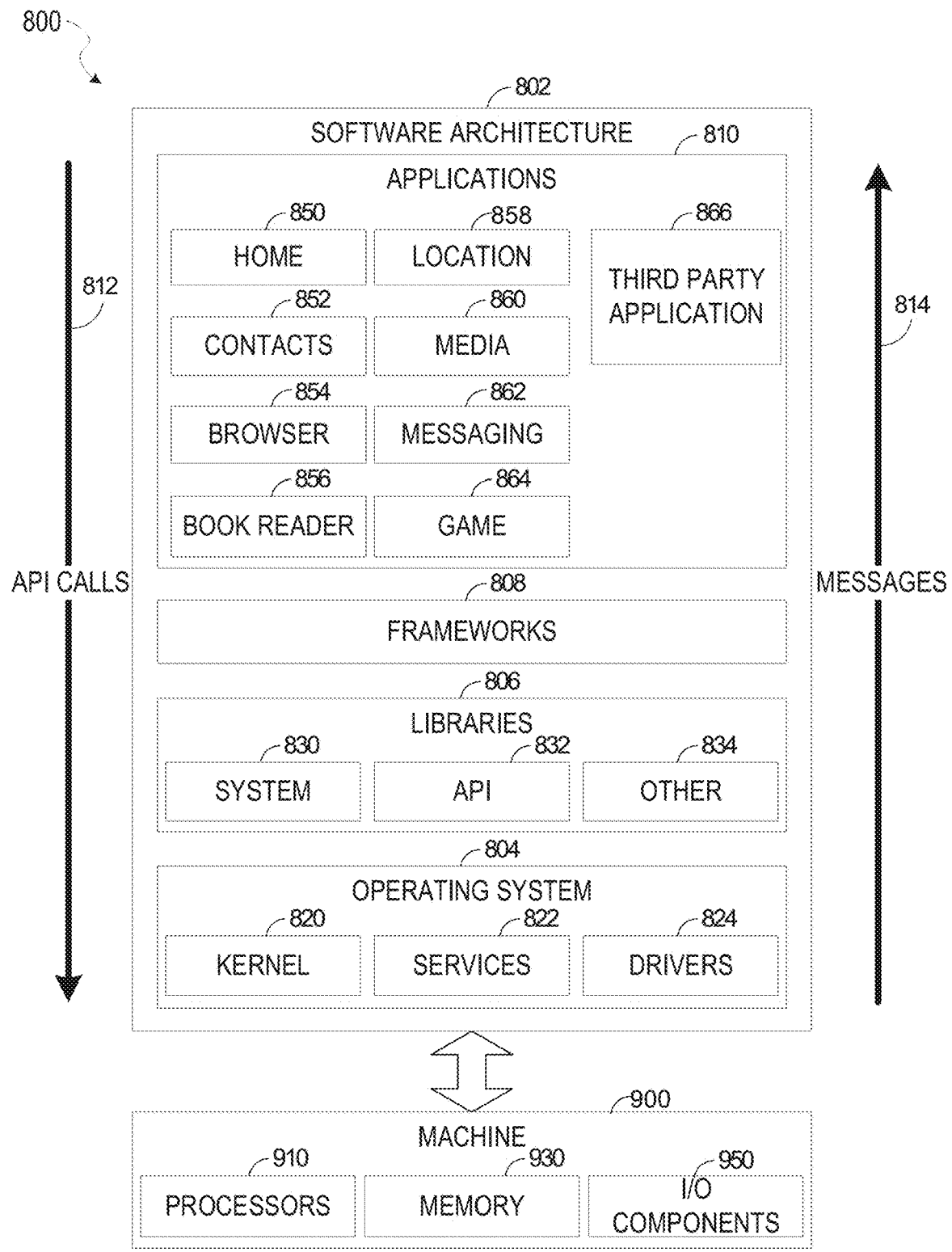
FIG. 7 is a block diagram illustrating a software architecture, in accordance with an example embodiment.
Figure 8:
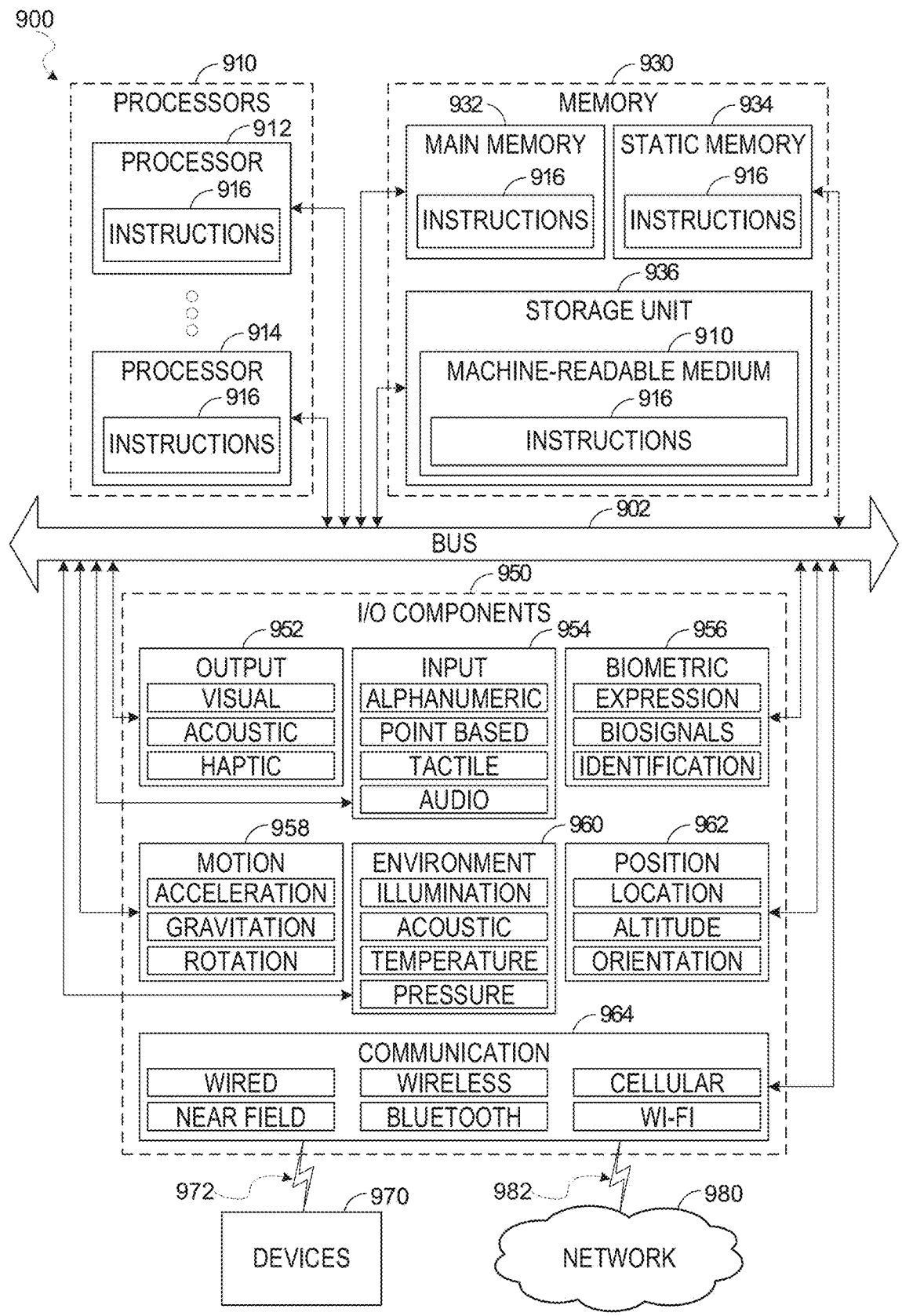
FIG. 8 illustrates a diagrammatic representation of a machine in the form of a computer system within which a set of instructions may be executed for causing the machine to perform any one or more of the methodologies discussed herein, consistent with embodiments of the present invention.

FIG. 7 is a block diagram 800 illustrating a software architecture 802, which can be installed on any one or more of the devices described above. FIG. 8 is merely a non-limiting example of a software architecture, and it will be appreciated that many other architectures can be implemented to facilitate the functionality described herein. In various embodiments, the software architecture 802 is implemented by hardware such as a machine 900 of FIG. 9 that includes processors 910, memory 930, and input/output (I/O) components 950. In this example architecture, the software architecture 802 can be conceptualized as a stack of layers where each layer may provide a particular functionality. For example, the software architecture 802 includes layers such as an operating system 804, libraries 806, frameworks 808, and applications 810. Operationally, the applications 810 invoke API calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810, according to some embodiments. For example, the frameworks 808 provide various GUI functions, high-level resource management, high-level location services, and so forth. The frameworks 808 can provide a broad spectrum of other APIs that can be utilized by the applications 810, some of which may be specific to a particular operating system 804 or platform.

In an example embodiment, the applications 810 include a home application 850, a contacts application 852, a browser application 854, a book reader application 856, a location application 858, a media application 860, a messaging application 862, a game application 864, and a broad assortment of other applications, such as a third-party application 866. According to some embodiments, the applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-party application 866 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 866 can invoke the API calls 812 provided by the operating system 804 to facilitate functionality described herein.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application 810, an applet, an app, or other executable code) for causing the machine 900 to perform any one or more of the methodologies discussed herein may be executed. For example, the instructions 916 may cause the machine 900 to execute the method 700 of FIG. 7. Additionally, or alternatively, the instructions 916 may implement FIGS. 1-7, and so forth. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a PC, a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors 910 that may comprise two or more independent processors 912 (sometimes referred to as "cores") that may execute instructions 916 contemporaneously. Although FIG. 9 shows multiple processors 910, the machine 900 may include a single processor 912 with a single core, a single processor 912 with multiple cores (e.g., a multi-core processor), multiple processors 910 with a single core, multiple processors 910 with multiple cores, or any combination thereof.

The memory 930 may include a main memory 932, a static memory 934, and a storage unit 936, all accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine 900 will depend on the type of machine 900. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion, and the grouping is in no way limiting. In various example embodiments, the I/O components 950 may include output components 952 and input components 954. The output components 952 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 962 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a USB).

Moreover, the communication components 964 may detect identifiers or include components operable to detect identifiers. For example, the communication components 964 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 930, 932, 934, and/or memory of the processor(s) 910) and/or the storage unit 936 may store one or more sets of instructions 916 and data structures (e.g., software) embodying or utilized by any one or more of the methodologies or functions described herein. These instructions (e.g., the instructions 916), when executed by the processor(s) 910, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 916 and/or data. The terms shall accordingly be taken to include, but not be limited to, solid-state memories, and optical and magnetic media, including memory internal or external to the processors 910. Specific examples of machine-storage media, computer-storage media, and/or device-storage media include non-volatile memory including, by way of example, semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 980 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 916 may be transmitted or received over the network 980 using a transmission medium via a network interface device (e.g., a network interface component included in the communication components 964) and utilizing any one of a number of well-known transfer protocols (e.g., HTTP). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system for suggesting skills to an end-user of an online service, the system comprising:
    a processor; and
    at least one memory storage device, storing instructions thereon, which, when executed by the processor, cause the system to perform operations comprising:
        obtaining a set of skills to be ranked for an end-user of the online service;
        obtaining a first set of features for use in generating a first score for each skill in the set of skills, the first score to be derived using a first machine-learned model that is based on a decision tree and has been trained with a pairwise approach, wherein each instance of training data includes a pair of skills having a first skill labeled as a positive example and a second skill labeled as a negative example;
        obtaining a second set of features for use in generating a second score for each skill in the set of skills, the second score to be derived using a second machine-learned model that is based on a multilayer perceptron neural network and has been trained with a listwise approach, wherein each instance of training data includes a plurality of skills, each skill in the plurality of skills labeled as being either a positive example or a negative example;
    for each skill in the set of skills:
        generating a first score for the respective skill by applying the first set of features to the first machine-learned model;
        generating a second score for the respective skill by applying the second set of features to the second machine-learned model; and
        combining the first score and the second score to derive a final score for each skill in the set of skills; and
    selecting, from the set of skills a predetermined number of skills having the highest final scores, for presentation to the end-user in a user interface; and
        presenting in the user interface the predetermined number of highest-ranking skills.

2. The system of claim 1, wherein the operations further comprise:
    for some percentage of end-users, randomly arranging the order in which the highest-ranking skills are presented in the user interface.

3. The system of claim 1, wherein the operations further comprise:
    for some percentage of end-users, randomly selecting skills when presenting the skills in the user interface.

4. The system of claim 1, wherein obtaining a set of skills to be ranked for an end-user of the online service comprises obtaining skills generated for the end-user by an implicit skills service, wherein the skills obtained via the implicit skills service are skills in a skill ontology maintained by the online service that match or otherwise correspond with one or more words used in a free form text portion of the profile of the end-user.

5. The system of claim 1, wherein obtaining a set of skills to be ranked for an end-user of the online service comprises obtaining skills generated for the end-user by an inferred skills service, wherein the skills generated by the inferred skills service are skills in a skill ontology maintained by the online service that the inferred skills service has determined are listed in profiles of other end-users who have one or more profile attributes in common with the end-user, as indicated in the profiles of the other end-users and the end-user.

6. The system of claim 5, wherein the combination of profile attributes shared in common include: a job title, a current company of employment, and an industry.

7. The system of claim 1, wherein obtaining a set of skills to be ranked for an end-user of the online service comprises obtaining skills from a skill utility service only when, after requesting skills from an implicit skills service and from an inferred skills service, the number of skills obtained from the implicit skills service and the inferred skills service is less than some predetermined threshold.

8. The system of claim 7, wherein obtaining a set of skills from the skill utility service comprises obtaining skills with the highest skill utility scores for a combination of end-user profile attributes, the skill utility scores associated with the set of candidate skills determined by the skill utility service by analyzing the frequency with which each skill is referenced in a plurality of job postings that have profile attributes that correspond with the combination of end-user profile attributes.

9. The system of claim 1, wherein the first set of features includes a skill utility score for each skill to be ranked, the skill utility score indicating a measure of frequency with which a skill is referenced within a plurality of job postings.

10. The system of claim 1, wherein the operations further comprise retraining the machine-learned model that is based on a decision tree and retraining the machine-learned model that is based on a multilayer perceptron neural network, using datasets that include information regarding skills that have been labeled as positive examples or negative examples, based on whether the skills were selected by and end-user when presented to an end-user.

11. A computer-implemented method for suggesting skills to an end-user of an online service, the method comprising:
    obtaining a set of skills to be ranked for an end-user of the online service;
    obtaining a first set of features for use in generating a first score for each skill in the set of skills, the first score to be derived using a first machine-learned model that is based on a decision tree and has been trained with a pairwise approach, wherein each instance of training data includes a pair of skills having a first skill labeled as a positive example and a second skill labeled as a negative example;

obtaining a second set of features for use in generating a second score for each skill in the set of skills, the second score to be derived using a second machine-learned model that is based on a multilayer perceptron neural network and has been trained with a listwise approach, wherein each instance of training data includes a plurality of skills, each skill in the plurality of skills labeled as being either a positive example or a negative example;

for each skill in the set of skills:

generating a first score for the respective skill by applying the first set of features to the first machine-learned model;

generating a second score for the respective skill by applying the second set of features to the second machine-learned model; and combining the first score and the second score to derive a final score for each skill in the set of skills; and selecting from the set of skills a predetermined number of skills having the highest final scores for presentation to the end-user in a user interface; and presenting in the user interface the predetermined number of highest-ranking skills.

12. The method of claim 11, wherein the method further comprises:

for some percentage of end-users, randomly arranging the order in which the highest-ranking skills are presented in the user interface.

13. The method of claim 11, wherein the method further comprises:

for some percentage of end-users, randomly selecting skills when presenting the skills in the user interface.

14. The method of claim 11, wherein obtaining a set of skills to be ranked for an end-user of the online service comprises obtaining skills generated for the end-user by an implicit skills service, wherein the skills obtained via the implicit skills service are skills in a skill ontology maintained by the online service that match or otherwise correspond with one or more words used in a free form text portion of the profile of the end-user.

15. The method of claim 11, wherein obtaining a set of skills to be ranked for an end-user of the online service comprises obtaining skills generated for the end-user by an inferred skills service, wherein the skills generated by the inferred skills service are skills in a skill ontology maintained by the online service that the inferred skills service has determined are listed in profiles of a number of other end-users who have some combination of profile attributes shared in common with the end-user, as indicated in the profiles of the other end-users and the end-user.

16. The method of claim 15, wherein the combination of profile attributes shared in common include: a job title, a current company of employment, and an industry.

17. The method of claim 11, wherein obtaining a set of skills to be ranked for an end-user of the online service comprises obtaining skills from a skill utility service only when, after requesting candidate skills from an implicit skills service and from an inferred skills service, the number of candidate skills obtained from the implicit skills service and the inferred skills service is less than some predetermined threshold.

18. The method of claim 17, wherein obtaining a set of skills from the skill utility service comprises obtaining skills with the highest skill utility scores for a combination of end-user profile attributes, the skill utility scores associated with the set of candidate skills determined by the skill utility service by analyzing the frequency with which each skill is referenced in a plurality of job postings that have profile attributes that correspond with the combination of end-user profile attributes.

19. The method of claim 11, wherein the first set of features includes a skill utility score for each skill to be ranked, the skill utility score indicating a measure of frequency with which a skill is referenced within a plurality of job postings.

20. A system comprising:

means for obtaining a set of skills to be ranked for an end-user of the online service;

means for obtaining a first set of features for use in generating a first score for each skill in the set of skills, the first score to be derived using a first machine-learned model that is based on a decision tree and has been trained with a pairwise approach, wherein each instance of training data includes a pair of skills having a first skill labeled as a positive example and a second skill labeled as a negative example;

means for obtaining a second set of features for use in generating a second score for each skill in the set of skills, the second score to be derived using a second machine-learned model that is based on a multilayer perceptron neural network and has been trained with a listwise approach, wherein each instance of training data includes a plurality of skills, each skill in the plurality of skills labeled as being either a positive example or a negative example;

for each skill in the set of skills:

means for generating a first score for the respective skill by applying the first set of features to the first machine-learned model;

means for generating a second score for the respective skill by applying the second set of features to the second machine-learned model; and means for combining the first score and the second score to derive a final score for each skill in the set of skills; and means for selecting from the set of skills a predetermined number of skills having the highest final scores for presentation to the end-user in a user interface; and means for presenting in the user interface the predetermined number of highest-ranking skills.

* * * * *

UNITED STATES PATENT AND TRADEMARK OFFICE
CERTIFICATE OF CORRECTION

PATENT NO. : 11,461,421 B2
APPLICATION NO. : 17/136864
DATED : October 4, 2022
INVENTOR(S) : Wang et al.

Page 1 of 1

It is certified that error appears in the above-identified patent and that said Letters Patent is hereby corrected as shown below:

In the Claims

In Column 23, Line 65, in Claim 1, after "skills", insert --,--

Signed and Sealed this
Third Day of January, 2023

*Katherine Kelly Vidal*

Katherine Kelly Vidal
*Director of the United States Patent and Trademark Office*